US012476525B2

(12) United States Patent
Nielsen

(10) Patent No.: US 12,476,525 B2
(45) Date of Patent: Nov. 18, 2025

(54) AXIAL FLUX ELECTRIC MACHINE WITH NON-AXISYMMETRIC STATORS

(71) Applicant: Raytheon Company, Waltham, MA (US)

(72) Inventor: Scott D. Nielsen, Sahuarita, AZ (US)

(73) Assignee: RAYTHEON COMPANY, Tewksbury, MA (US)

( * ) Notice: Subject to any disclaimer, the term of this patent is extended or adjusted under 35 U.S.C. 154(b) by 284 days.

(21) Appl. No.: 18/132,137

(22) Filed: Apr. 7, 2023

(65) Prior Publication Data

US 2024/0339903 A1 Oct. 10, 2024

(51) Int. Cl.
H02K 16/00 (2006.01)
H02K 1/14 (2006.01)
H02K 1/17 (2006.01)
H02K 1/24 (2006.01)
H02K 1/2793 (2022.01)

(52) U.S. Cl.
CPC .............. H02K 16/00 (2013.01); H02K 1/14 (2013.01); H02K 1/17 (2013.01); H02K 1/24 (2013.01); H02K 1/2793 (2013.01)

(58) Field of Classification Search
CPC .... H02K 1/182; H02K 1/2793; H02K 1/2795; H02K 1/2796; H02K 1/2798; H02K 1/14; H02K 1/17; H02K 1/06
USPC .................. 310/154.05, 49.22, 49.37, 49.44
See application file for complete search history.

(56) References Cited

U.S. PATENT DOCUMENTS

| 4,661,735 | A | * | 4/1987 | Miki | H02K 7/14 |
| 5,829,542 | A | * | 11/1998 | Lutz | B60K 6/46 |
| | | | | | 280/124.156 |
| 5,903,118 | A | * | 5/1999 | Miekka | H02K 3/18 |
| | | | | | 318/400.41 |
| 5,917,257 | A | | 6/1999 | Taghezout | |
| 6,265,802 | B1 | * | 7/2001 | Getschmann | H02K 1/28 |
| | | | | | 310/156.34 |
| 9,369,011 | B2 | | 6/2016 | Greetham | |
| 2003/0197080 | A1 | | 10/2003 | John, Jr. | |
| 2006/0103263 | A1 | | 5/2006 | Naito | |
| 2013/0181562 | A1 | * | 7/2013 | Gieras | H02K 16/02 |
| | | | | | 310/114 |

(Continued)

FOREIGN PATENT DOCUMENTS

WO    WO-2021124313 A1 *  6/2021

OTHER PUBLICATIONS

WO_2021124313_A1_-_Translate.pdf (Year: 2025).*
International Search Report and Written Opinion for PCT Application No. PCT/US2024/023502 dated Jul. 30, 2024.

*Primary Examiner* — Christopher M Koehler
*Assistant Examiner* — Ahmed F Seck
(74) *Attorney, Agent, or Firm* — Getz Balich LLC

(57) ABSTRACT

An apparatus is provided that is configured as or otherwise includes an axial flux electric machine. This axial flux electric machine includes a plurality of rotors, a plurality of stators and a shaft rotatable about an axis. The rotors are disposed axially along the axis and are mounted to the shaft. Each of the rotors includes a plurality of rotor magnets. The stators are axially interspersed with the rotors along the axis. Each of the stators includes a plurality of stator magnets. The stator magnets of a first of the stators are arranged asymmetrically about the axis.

20 Claims, 5 Drawing Sheets

(56) References Cited

U.S. PATENT DOCUMENTS

2015/0311756 A1\* 10/2015 Sullivan ............... H02K 1/2791
                                                310/156.37
2018/0328064 A1\* 11/2018 Peastrel ............... H05K 5/0247
2018/0355769 A1    12/2018 Stone
2020/0186061 A1     6/2020 Born
2020/0373797 A1    11/2020 Culleton, III \* cited by examiner

AXIAL FLUX ELECTRIC MACHINE WITH NON-AXISYMMETRIC STATORS

BACKGROUND OF THE DISCLOSURE

1. Technical Field

This disclosure relates generally to an apparatus with an axial flux electric machine.

2. Background Information

Various types and configurations of electric machines are known in the art, which electric machines may be operated as electric motors and/or electric generators. Known electric machines include radial flux electric machines and axial flux electric machines. While these known electric machines have various benefits, there is still room in the art for improvement.

SUMMARY OF THE DISCLOSURE

According to an aspect of the present disclosure, an apparatus is provided that is configured as or otherwise includes an axial flux electric machine. This axial flux electric machine includes a plurality of rotors, a plurality of stators and a shaft rotatable about an axis. The rotors are disposed axially along the axis and are mounted to the shaft. Each of the rotors includes a plurality of rotor magnets. The stators are axially interspersed with the rotors along the axis. Each of the stators includes a plurality of stator magnets. The stator magnets of a first of the stators are arranged asymmetrically about the axis.

According to another aspect of the present disclosure, another apparatus is provided that is configured as or otherwise includes an axial flux electric machine. This axial flux electric machine includes a plurality of rotors, a plurality of stators and a shaft rotatable about an axis. The rotors are disposed axially along the axis and are mounted to the shaft. Each of the rotors includes a plurality of rotor magnets. The stators are axially interspersed with the rotors along the axis. Each of the stators includes a plurality of stator magnets. A first of the stators extends partially circumferentially around the shaft between circumferentially opposing ends of the first of the stators.

According to still another aspect of the present disclosure, another apparatus is provided that includes a first axial flux electric machine and a second axial flux electric machine. The first axial flux electric machine includes a first rotating assembly and a plurality of first stators. The first rotating assembly includes a plurality of first rotors and a first shaft rotatable about a first axis. The first rotors are disposed axially along the first axis and are mounted to the first shaft. The first stators are axially interspersed with the first rotors along the first axis. The second axial flux electric machine includes a second rotating assembly and a plurality of second stators. The second rotating assembly includes a plurality of second rotors and a second shaft rotatable about a second axis. The second rotors are disposed axially along the second axis and are mounted to the second shaft. The second stators are axially interspersed with the second rotors along the second axis. The second rotating assembly laterally overlap the first rotating assembly.

Each of the first stators may include a plurality of first stator magnets. The first stator magnets of a first of the first stators may be arranged asymmetrically about the first axis.

The stator magnets of the first of the stators may include a first magnet, a second magnet and a third magnet. The second magnet may be adjacent and circumferentially between the first magnet and the third magnet. The second magnet may be spaced from the first magnet by a first distance. The second magnet may be spaced from the third magnet by a second distance that is different than the first distance.

The stator magnets of the first of the stators may also include a fourth magnet. The third magnet may be adjacent and circumferentially between the second magnet and the fourth magnet. The third magnet may be spaced from the fourth magnet by a third distance that is equal to the second distance.

The stator magnets of the first of the stators may be arranged in an array. Each adjacent pair of the stator magnets within the array may be circumferentially spaced by a common inter-magnet distance. The array may extend circumferentially about the axis between opposing ends of the array. A circumferential distance between the opposing ends of the array may be different than the common inter-magnet distance.

The first of the stators may extend partially circumferentially around the shaft between circumferentially opposing ends of the first of the stators.

The stator magnets of each of the stators may be arranged asymmetrically about the axis.

The rotor magnets of a first of the rotors may be arranged symmetrically about the axis.

The rotor magnets of each of the rotors may be arranged symmetrically about the axis.

The rotor magnets may be configured as or otherwise include permanent magnets.

The stator magnets may be configured as or otherwise include electromagnet coils.

The rotor magnets may be configured as or otherwise include electromagnet coils.

The stator magnets may be configured as or otherwise include permanent magnets.

The axial flux electric machine may be configured as an axial flux electric motor.

The apparatus may also include a second axial flux electric machine. This second axial flux electric machine may include a plurality of second rotors, a plurality of second stators and a second shaft rotatable about a second axis. The second rotors may be disposed axially along the second axis and may be mounted to the second shaft. Each of the second rotors may include a plurality of second rotor magnets. A first of the second rotors may be axially aligned with the first of the stators. The second stators may be axially interspersed with the second rotors along the second axis. Each of the second stators may include a plurality of second stator magnets. A first of the second stators may be axially aligned with a first of the rotors.

The first of the second rotors may laterally overlap the first of the rotors.

The second stator magnets of the first of the second stators may be arranged asymmetrically about the second axis.

The apparatus may also include a first drivetrain and a second drivetrain. The first drivetrain may be coupled to the shaft. The second drivetrain may be coupled to the second shaft.

The apparatus may also include a drivetrain coupled to the shaft and the second shaft.

A first of the rotors may include one or more cutting teeth at an outer periphery of the first of the rotors.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
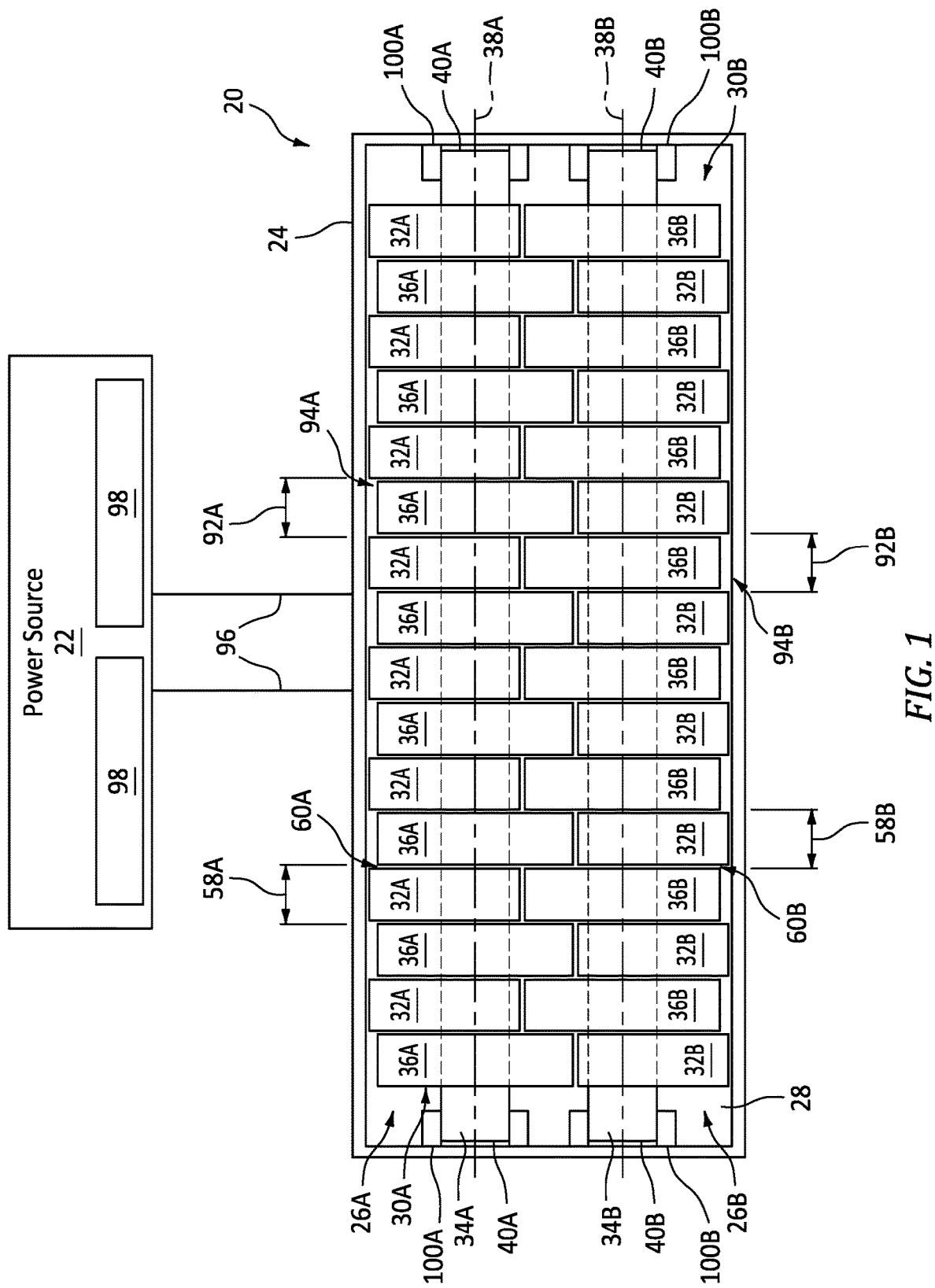
FIG. 1 is a schematic illustration of an electric power unit electrically coupled to a power source.

FIG. 1 illustrates an electric power unit 20 electrically coupled to a power source 22. The power unit 20 includes a housing 24 (e.g., a casing) and one or more axial flux electric machines 26A and 26B (generally referred to as "26") arranged within an internal cavity 28 of the housing 24.

Each electric machine 26 may be configurable as an electric motor and/or an electric generator. For example, in a motor mode of operation, each electric machine 26 may convert electricity received from the power source 22 into mechanical power. During a generator mode of operation, however, each electric machine 26 may convert mechanical power into electricity. This electricity may be used for various purposes such as, for example, charging the power source 22 and/or electrically powering one or more other electrical devices. Of course, in other embodiments, one or each electric machine 26 may alternatively be configured as a dedicated electric motor (e.g., without the electric generator functionality) or as a dedicated electric generator (e.g., without the electric motor functionality). Furthermore, while the electric machines 26 may be concurrently operated in a common (e.g., motor or generator) mode of operation, it is also contemplated the electric machines 26 may alternatively be concurrently operated in different modes where, for example, the electric machines 26 are respectively coupled to discrete mechanical devices. However, for ease of description, the electric machines 26 may be described below as operating in the motor mode of operation.

Each electric machine 26A, 26B includes an electric machine rotating assembly 30A, 30B (generally referred to as "30") and one or more electric machine stators 32A, 32B (generally referred to as "32"). The machine rotating assembly 30A, 30B includes an electric machine shaft 34A, 34B (generally referred to as "34") and one or more electric machine rotors 36A, 36B (generally referred to as "36"). The machine rotating assembly 30A, 30B is rotatable about a rotational axis 38A, 38B (generally referred to as "38"), which rotational axis 38 may also be a centerline axis of the respective electric machine 26 and/or one or more or all of its members 32, 34 and/or 36.

The machine shaft 34 is rotatable about the respective rotational axis 38. The machine shaft 34A, 34B extends axially along the respective rotational axis 38A, 38B between and to opposing axial ends 40A, 40B (generally referred to as "40") of that machine shaft 34.

Figure 2:
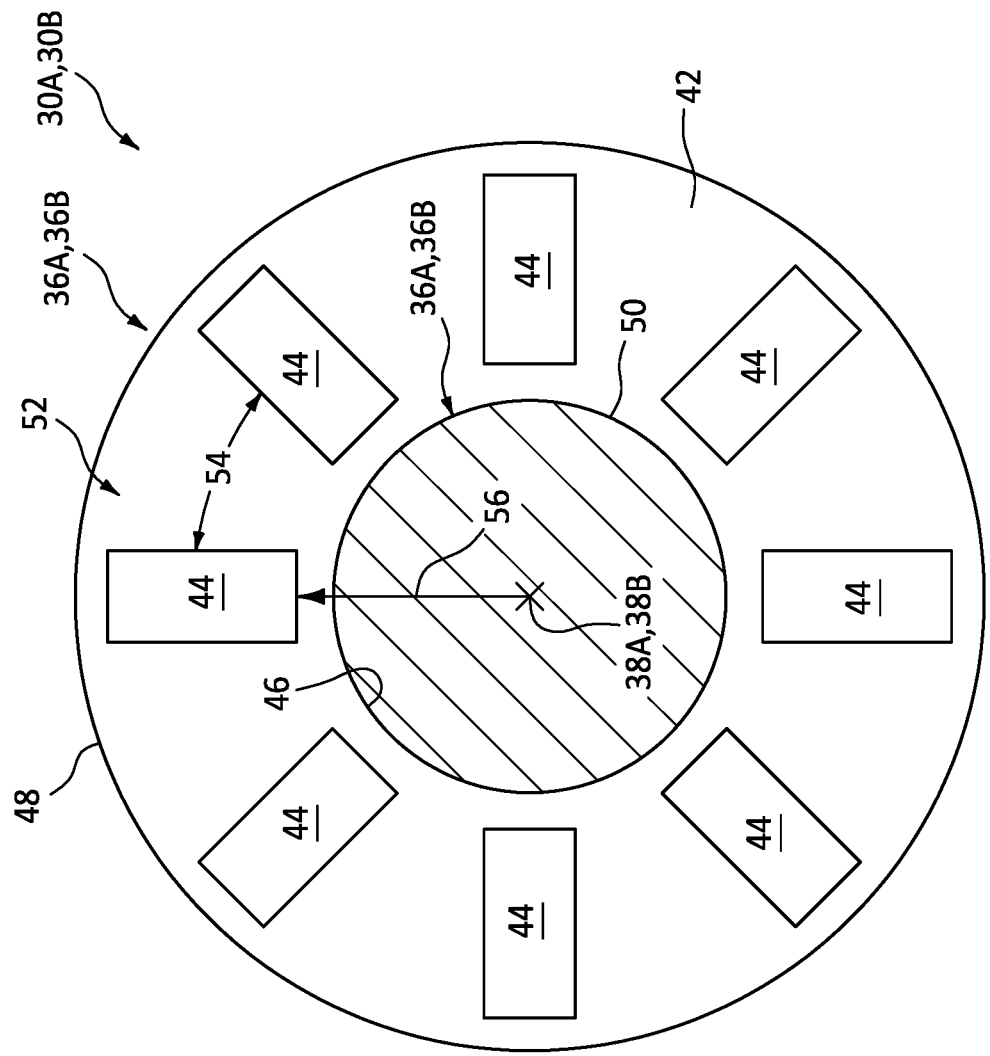
FIG. 2 is a schematic illustration of an electric machine rotor.

Referring to FIG. 2, each electric machine rotor 36 may have an annular plate or disk configuration; e.g., an axisymmetric, circular configuration. Each electric machine rotor 36 of FIG. 2, for example, includes a rotor body 42 and one or more rotor magnets 44. The rotor body 42 extends radially from a radial inner side 46 of the respective electric machine rotor 36 and its rotor body 42 to a radial outer side 48 of the respective electric machine rotor 36 and its rotor body 42. The rotor outer side 48 of FIG. 2 has a circular geometry when viewed in a reference plane, for example, perpendicular to the respective rotational axis 38; however, the present disclosure is not limited to such an exemplary rotor outer side shape. The rotor body 42 extends (e.g., completely) circumferentially around the respective rotational axis 38, providing the respective electric machine rotor 36 and its rotor body 42 with a full-hoop (e.g., annular) geometry. The rotor body 42 thereby forms an inner bore 50 which extends axially through the rotor body 42 as well as, more generally, through the respective electric machine rotor 36.

Each of the rotor magnets 44 may be configured as or otherwise include a permanent magnet. Alternatively, one or more or all of the rotor magnets 44 may be configured as or otherwise include an electromagnet coil (e.g., winding) of an electromagnet. This electromagnet may be configured as a single phase electromagnet or a multi-phase (e.g., three phase) electromagnet.

The rotor magnets 44 are arranged circumferentially about the respective rotational axis 38 in an annular (e.g., circular) array 52. The rotor magnets 44 may be circumferentially equispaced about the respective rotational axis 38 within the rotor magnet array 52. Each circumferentially neighboring (e.g., adjacent) pair of the rotor magnets 44, for example, may be circumferentially spaced by a common (the same) circumferential inter-magnet distance 54. The rotor magnets 44 may be disposed at a common radial distance 56 from the respective rotational axis 38.

The rotor magnets 44 may be mechanically fastened, bonded or otherwise attached to the rotor body 42, on an exterior of the rotor body 42 and/or partially or completely embedded into the rotor body 42. Alternatively, it is contemplated one or more or all of the rotor magnets 44 may be integrated as part of the rotor body 42; e.g., ferromagnetic material of (or included in) the rotor body 42 may be selectively magnetized.

Each electric machine rotor 36 is mounted (e.g., directly or indirectly) to the respective machine shaft 34. The machine shaft 34 of FIG. 2, for example, projects axially through each rotor bore 50. Each electric machine rotor 36 and its rotor body 42 is fixedly attached (e.g., press fit, bonded, etc.) to the respective machine shaft 34. Each electric machine rotor 36 is thereby rotatable with the respective machine shaft 34 about the respective rotational axis 38.

Referring to FIG. 1, the electric machine rotors 36 are disposed axially along the respective rotational axis 38. Within the same machine rotating assembly 30, the electric machine rotors 36 may be axially equispaced along the respective machine shaft 34 and the respective rotational axis 38. Each axially neighboring pair of the electric machine rotors 36A, 36B (in the same machine rotating assembly 30A, 30B), for example, may be axially spaced by a common axial inter-rotor distance 58A, 58B (generally referred to as "58"). With such an arrangement, each axially neighboring pair of the electric machine rotors 36 (in the same machine rotating assembly 30) are axially separated along the respective rotational axis 38 by an axial inter-rotor gap 60A, 60B (generally referred to as "60"). The present disclosure, however, is not limited to such an exemplary equispaced arrangement.

Figure 3:
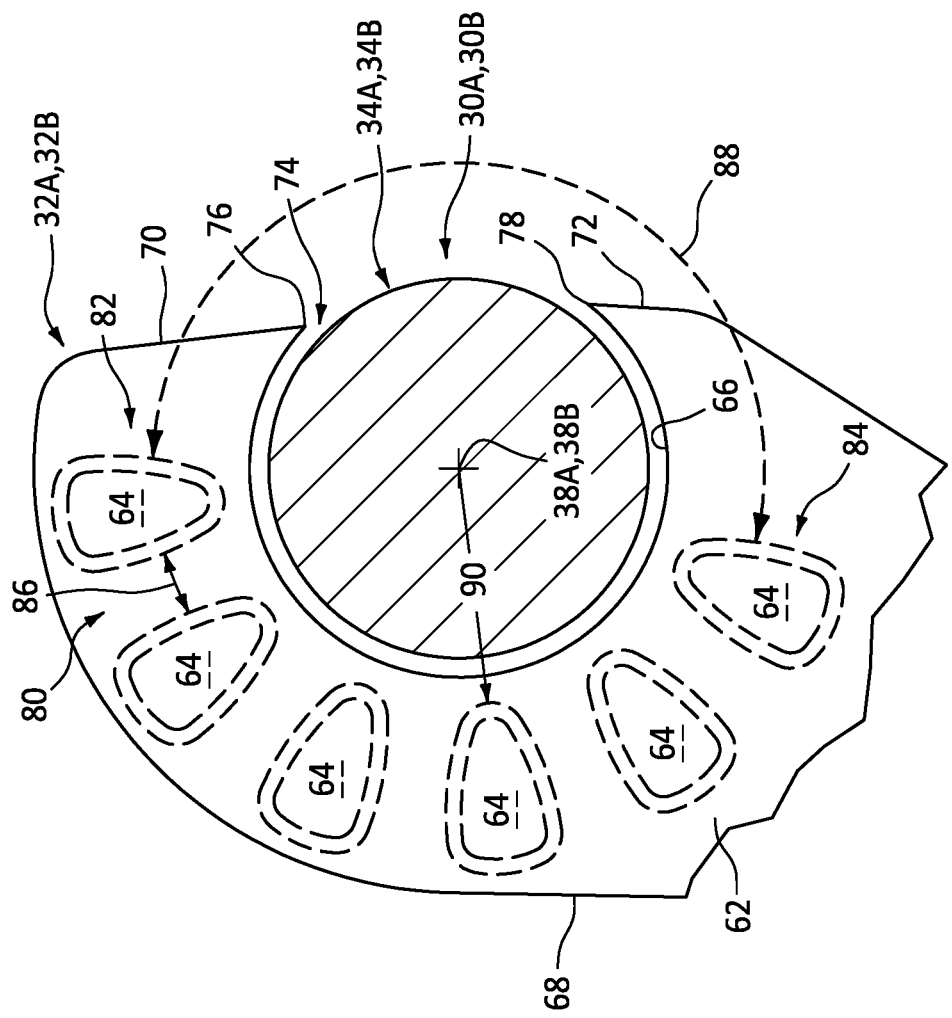
FIG. 3 is a schematic illustration of an electric machine stator.

Referring to FIG. 3, each electric machine stator 32 may have a non-annular plate or disk configuration; e.g., a non-axisymmetric configuration. Each electric machine stator 32 of FIG. 3, for example, includes a (e.g., channeled) stator body 62 and one or more stator magnets 64. The stator body 62 extends radially from a radial inner side 66 of the respective electric machine stator 32 and its stator body 62 to a radial outer side 68 of the respective electric machine stator 32 and its stator body 62. The stator outer side 68 may have an arcuate, polygonal or other geometry when viewed in a reference plane, for example, perpendicular to the respective rotational axis 38. The stator body 62 extends (e.g., partially) circumferentially about the respective rotational axis 38 between opposing circumferential sides 70 and 72 of the respective electric machine stator 32 and its stator body 62. Here, the respective electric machine stator 32 and its stator body 62 is configured with an open aperture 74; e.g., an open inner bore, a channel, etc. The open aperture 74 projects radially into the stator body 62 as well as, more generally, the respective electric machine stator 32 from (e.g., interior) edges 76 and 78 between the stator circumferential sides 70 and 72 and the stator inner side 66. The open aperture 74 extends axially through the stator body 62 as well as, more generally, the respective electric machine stator 32.

Each of the stator magnets 64 may be configured as or otherwise include an electromagnet coil (e.g., winding) of an electromagnet. This electromagnet may be configured as a single phase electromagnet or a multi-phase (e.g., three phase) electromagnet. Alternatively, one or more or all of the stator magnets 64 may be configured as or otherwise include a permanent magnet. In general, the stator magnets 64 may be configured as or otherwise include the electromagnetic coils where the rotor magnets 44 (see FIG. 2) are configured as or otherwise include the permanent magnets. Conversely, the stator magnets 64 may be configured as or otherwise include the permanent magnet where the rotor magnets 44 (see FIG. 2) are configured as or otherwise include the electromagnetic coils.

The stator magnets 64 are arranged circumferentially about the respective rotational axis 38 in an (e.g., arcuate) array 80. This stator magnet array 80 extends circumferentially about the respective rotational axis 38 between opposing circumferential ends 82 and 84 of the stator magnet array 80, where each array end 82, 84 may be disposed at (e.g., on, adjacent or proximate) a respective one of the stator circumferential ends 70, 72. The stator magnets 64 may be circumferentially equispaced about the respective rotational axis 38 within the stator magnet array 80. Each circumferentially neighboring pair of the stator magnets 64 within the stator magnet array 80, for example, may be circumferentially spaced by a common (the same) circumferential inter-magnet distance 86. However, the stator magnet 64 at/forming the array end 82 and the stator magnet 64 at/forming the array end 84 may be circumferentially spaced by a circumferential distance 88 that is different (e.g., larger) than the circumferential inter-magnet distances 86 within the stator magnet array 80. The circumferential distance 88, for example, may be sized (e.g., 2×, 5×, 10×, etc.) larger than each circumferential inter-magnet distance 86. The stator magnets 64 may be disposed at a common radial distance 90 from the respective rotational axis 38.

The stator magnets 64 may be mechanically fastened, bonded or otherwise attached to the stator body 62, on an exterior of the stator body 62 and/or partially or completely embedded into the stator body 62. Alternatively, it is contemplated one or more or all of the stator magnets 64 may be integrated as part of the stator body 62; e.g., ferromagnetic material of (or included in) the stator body 62 may be selectively magnetized.

Each electric machine stator 32 is arranged with the respective machine shaft 34. The machine shaft 34 of FIG. 3, for example, projects through each open aperture 74. The stator inner side 66 is radially spaced outward from the respective machine shaft 34. The machine shaft 34 of FIG. 3 is thereby rotatable within and relative to the electric machine stator 32.

Referring to FIG. 1, the electric machine stators 32 are mounted (e.g., directly or indirectly) to the housing 24. Each electric machine stator 32, for example, may be mechanically fastened, bonded and/or otherwise fixedly attached to the housing 24. The electric machine stators 32 are disposed axially along the respective rotational axis 38. Within the same electric machine 26, the electric machine stators 32 may be axially equispaced along the respective machine shaft 34 and the respective rotational axis 38. Each axially neighboring pair of the electric machine stators 32A, 32B (in the same electric machine 26A, 26B), for example, may be axially spaced by a common axial inter-stator distance 92A, 92B (generally referred to as "92"), which may be equal to the inter-rotor distance 58A, 58B. With such an arrangement, each axially neighboring pair of the electric machine stators 32A, 32B (in the same electric machine 26) are axially separated along the respective rotational axis 38A, 38B by an axial inter-stator gap 94A, 94B (generally referred to as "94"). The present disclosure, however, is not limited to such an exemplary equispaced arrangement.

The first electric machine 26A and the second electric machine 26B may be closely arranged within the housing 24 and its cavity 28 so as to, for example, almost intermingle and/or mesh with one another. The first machine rotating assembly 30A, for example, may laterally (e.g., generally radially) overlap the second machine rotating assembly 30B. Each first electric machine rotor 36A of FIG. 1, for example, is axially aligned with a respective one of the second electric machine stators 32B. One or more of the first electric machine rotors 36A may thereby project partially laterally into a respective one of the inter-rotor gaps 60B in the second machine rotating assembly 30B towards an open end of the open aperture 74 (see FIG. 3) in a respective one of the second electric machine stators 32B, without contacting the respective second electric machine stator 32B or the adjacent second electric machine rotors 36B. Similarly, each second electric machine rotor 36B of FIG. 1 is axially aligned with a respective one of the first electric machine stators 32A. One or more of the second electric machine rotors 36B may thereby project partially laterally into a respective one of the inter-rotor gaps 60A in the first machine rotating assembly 30A towards an open end of the open aperture 74 (see FIG. 3) in a respective one of the first electric machine stators 32A, without contacting the respective first electric machine stator 32A or the adjacent first electric machine rotors 36A. The machine rotating assemblies 30 and their rotational axes 38 may therefore be arranged laterally close together without interfering with one another. This close knit arrangement may be facilitated by providing the electric machine stators 32 with their non-axisymmetric configurations.

The power source 22 is electrically coupled with each electric machine 26 through one or more electrical leads 96. The power source 22 is configured to store electricity. The power source 22 is also configured to provide the stored electricity to the electric machine 26 and/or receive electricity from the electric machine 26; e.g., during power source recharging. The power source 22, for example, may be configured as or otherwise include one or more batteries 98 and/or one or more other electricity storage devices.

During operation, an electric field is generated between each respective rotor-stator pair. This electric field may be generated by directing electricity from the power source 22 to the electromagnets, either in the electric machine stators 32 or the electric machine rotors 36. Alternatively, the electric field may be generated by driving rotation of the machine rotating assemblies 30. While each respective rotor-stator pair may be unbalanced (in terms of electromagnetic flux) given the non-axisymmetric configuration of the electric machine stators 32, each electric machine 26 as a whole may be balanced (in terms of electromagnetic flux) by timing phases of the electric fields for the multiple rotor-stator pairs in each electric machine 26. The electric machines 26 therefore may be utilized for various continuous rotation applications, or alternatively for various intermittent and/or momentary rotation applications.

In some embodiments, each machine rotating assembly 30A, 30B and its machine shaft 34A, 34B may be rotatably supported within the housing 24 by one or more bearings 100A, 100B (generally referred to as "100"); e.g., roller bearings, journal bearings, etc. The bearings 100 may be arranged at the shaft axial ends 40. The bearing(s) 100 may also or alternatively be arranged at one or more intermediate locations along an axial span of the respective machine rotating assembly 30 and its machine shaft 34. Moreover, it is contemplated at least one of the electric machine stators 32 may also be configured as a bearing mount for a respective one of the bearings 100.

Figure 4:
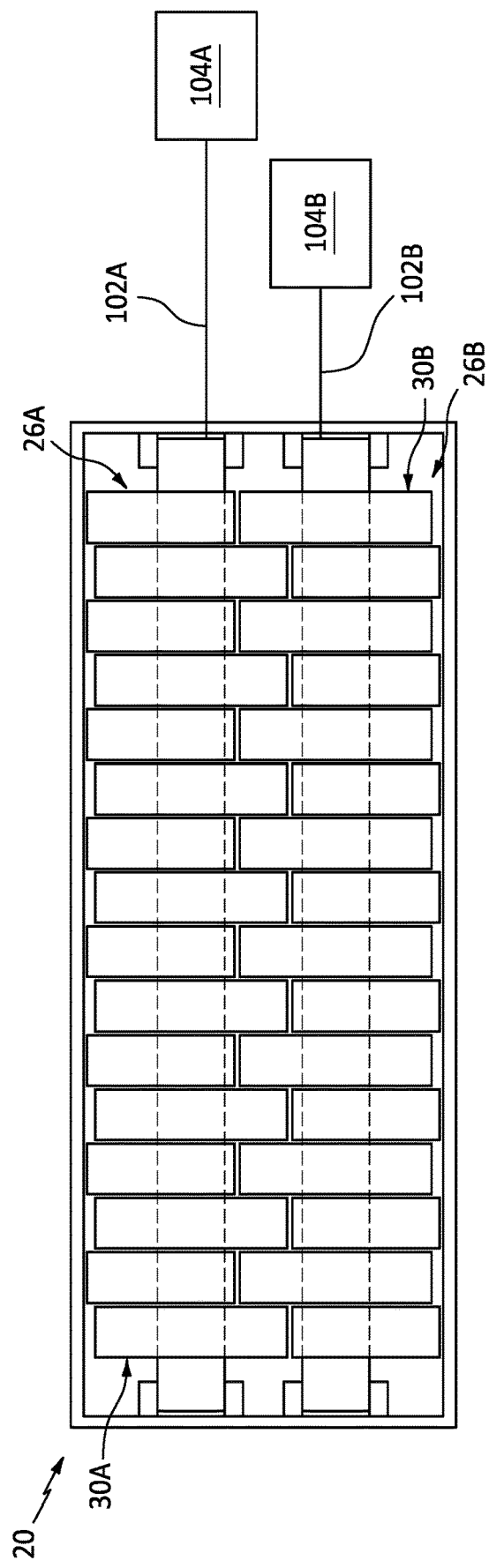
FIG. 4 is a schematic illustration of the electric power unit operatively coupled to multiple rotors.

In some embodiments, referring to FIG. 4, each electric machine 26A, 26B may be coupled to a respective drivetrain 102A, 102B (generally referred to as "102"). Each drivetrain 102 may couple the respective electric machine 26 and its machine rotating assembly 30 to a respective rotor 104A, 104B (generally referred to as "104"); e.g., a wheel, a gear, a pulley, a disk, etc. Each electric machine 26 may thereby rotatably drive the rotor 104 (e.g., a driven rotor) when operating as the electric motor through the respective drivetrain 102. However, it is contemplated the rotor 104 (e.g., a drive rotor such as a turbine rotor, a flywheel, a vehicle wheel or the like) may alternatively rotatably drive the respective machine rotating assembly 30 when the respective electric machine 26 is operating as the electric generator.

Figure 5:
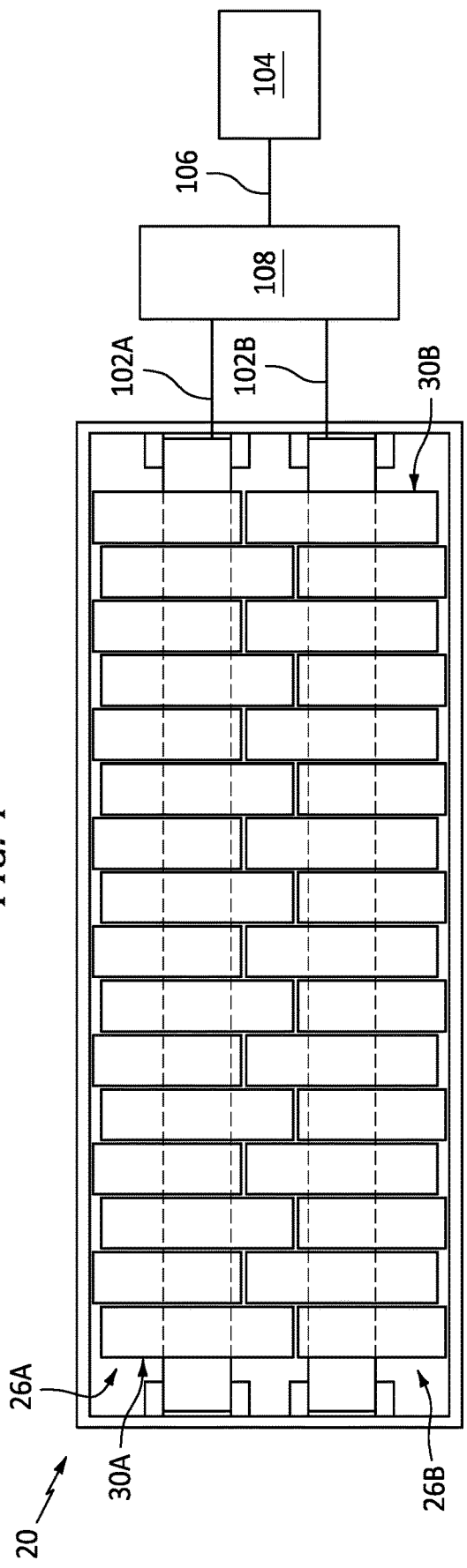
FIG. 5 is a schematic illustration of the electric power unit operatively coupled to a common rotor.

While each electric machine 26 may be individually operable and coupled to a discrete device, the present disclosure is not limited thereto. For example, referring to FIG. 5, the electric machines 26 may alternatively be coupled to a common drivetrain 106 through, for example, a coupler 108; e.g., a transmission, a gearbox, etc. With such an arrangement, both electric machines 26 may drive rotation of the rotor 104 through the drivetrain 106 concurrently, or independently. By driving rotation of the rotor 104 concurrently, power delivery to the rotor 104 is increased by utilizing multiple electric machines 26. By driving rotation of the rotor 104 independently, one electric machine 26 may be configured for, for example, high torque, low speed rotor rotation and the other electric machine 26 may be configured for low torque, high speed rotor rotation. The present disclosure, however, is not limited to the foregoing exemplary arrangements.

Figure 6:
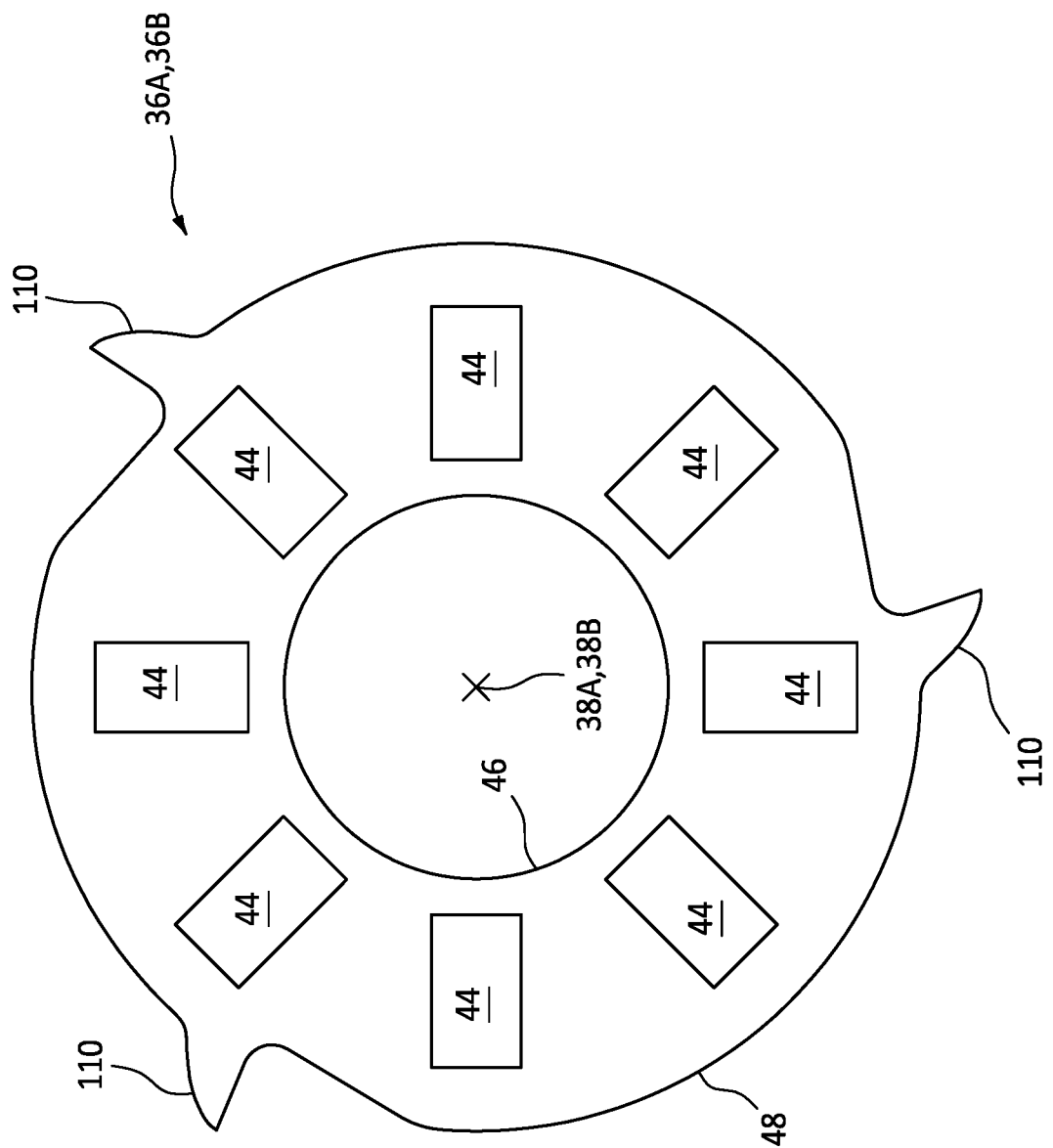
FIG. 6 is a schematic illustration of the electric machine rotor configured with one or more cutting teeth.

In some embodiments, referring to FIG. 6, one or more or all of the electric machine rotors 36 may each be configured with one or more cutting teeth 110 at an outer periphery—the rotor outer side 48—of the respective electric machine rotor 36. With such an arrangement, the power unit 20 of FIG. 1 may be configured as, for example, an industrial shredder, mulcher and/or other material processor.

While various power unit applications are described above, the present disclosure is not limited thereto. Moreover, the power unit 20 of the present disclosure may be broadly utilized in various land-based, aquatic and/or aerial vehicle applications, industrial equipment applications, consumer equipment applications as well as various other applications which would benefit from use of the multi-electric machine power unit. However, it is also contemplated the power unit 20 may alternatively be configured with a single one of its electric machines 26 for select (e.g., compact, space restricted) applications.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus, comprising:
a first axial flux electric machine including a plurality of first rotors, a plurality of first stators and a first shaft rotatable about a first axis;
the plurality of first rotors disposed axially along the first axis and mounted to the first shaft, and each of the plurality of first rotors comprising a plurality of first rotor magnets; and
the plurality of first stators axially interspersed with the plurality of first rotors along the first axis, each of the plurality of first stators comprising a plurality of first stator magnets, and the plurality of first stator magnets of a first of the plurality of first stators arranged asymmetrically about the first axis; and
a second axial flux electric machine including a plurality of second rotors, a plurality of second stators and a second shaft rotatable about a second axis;
the plurality of second rotors disposed axially along the second axis and mounted to the second shaft, each of the plurality of second rotors comprising a plurality of second rotor magnets, and a first of the plurality of second rotors axially aligned with the first of the plurality of first stators; and
the plurality of second stators axially interspersed with the plurality of second rotors along the second axis, each of the plurality of second stators comprising a plurality of second stator magnets, and a first of the plurality of second stators axially aligned with a first of the plurality of first rotors.

2. The apparatus of claim 1, wherein
the plurality of first stator magnets of the first of the plurality of first stators include a first magnet, a second magnet and a third magnet;

the second magnet is adjacent and circumferentially between the first magnet and the third magnet;

the second magnet is spaced from the first magnet by a first distance; and the second magnet is spaced from the third magnet by a second distance that is different than the first distance.

3. The apparatus of claim 2, wherein the plurality of first stator magnets of the first of the plurality of first stators further include a fourth magnet;

the third magnet is adjacent and circumferentially between the second magnet and the fourth magnet; and the third magnet is spaced from the fourth magnet by a third distance that is equal to the second distance.

4. The apparatus of claim 1, wherein the plurality of first stator magnets of the first of the plurality of first stators are arranged in an array;

each adjacent pair of the plurality of first stator magnets within the array are circumferentially spaced by a common inter-magnet distance; and the array extends circumferentially about the first axis between opposing ends of the array, and a circumferential distance between the opposing ends of the array is different than the common inter-magnet distance.

5. The apparatus of claim 1, wherein the first of the plurality of first stators extends partially circumferentially around the first shaft between circumferentially opposing ends of the first of the plurality of first stators.

6. The apparatus of claim 1, wherein the plurality of first stator magnets of each of the plurality of first stators are arranged asymmetrically about the first axis.

7. The apparatus of claim 1, wherein the plurality of first rotor magnets of a first of the plurality of first rotors are arranged symmetrically about the first axis.

8. The apparatus of claim 1, wherein the plurality of first rotor magnets of each of the plurality of first rotors are arranged symmetrically about the first axis.

9. The apparatus of claim 1, wherein the plurality of first rotor magnets comprise permanent magnets; and the plurality of first stator magnets comprises electromagnet coils.

10. The apparatus of claim 1, wherein the plurality of first rotor magnets comprise electromagnet coils; and the plurality of first stator magnets comprises permanent magnets.

11. The apparatus of claim 1, wherein the first axial flux electric machine is configured as an axial flux electric motor.

12. The apparatus of claim 1, wherein the first of the plurality of second rotors laterally overlaps the first of the plurality of first rotors.

13. The apparatus of claim 1, wherein the plurality of second stator magnets of the first of the plurality of second stators are arranged asymmetrically about the second axis.

14. The apparatus of claim 1, further comprising:

a first drivetrain coupled to the first shaft; and a second drivetrain coupled to the second shaft.

15. The apparatus of claim 1, further comprising a drivetrain coupled to the first shaft and the second shaft.

16. The apparatus of claim 1, wherein a first of the plurality of first rotors includes one or more cutting teeth at an outer periphery of the first of the plurality of first rotors.

17. An apparatus, comprising:

a first axial flux electric machine including a first rotating assembly and a plurality of first stators, the first rotating assembly including a plurality of first rotors and a first shaft rotatable about a first axis, the plurality of first rotors disposed axially along the first axis and mounted to the first shaft, and the plurality of first stators axially interspersed with the plurality of first rotors along the first axis; and a second axial flux electric machine including a second rotating assembly and a plurality of second stators, the second rotating assembly including a plurality of second rotors and a second shaft rotatable about a second axis, the plurality of second rotors disposed axially along the second axis and mounted to the second shaft, and the plurality of second stators axially interspersed with the plurality of second rotors along the second axis;

wherein the second rotating assembly laterally overlaps the first rotating assembly.

18. The apparatus of claim 17, wherein each of the plurality of first stators comprises a plurality of first stator magnets; and the plurality of first stator magnets of a first of the plurality of first stators are arranged asymmetrically about the first axis.

19. An apparatus, comprising:

a first electric machine including a plurality of first rotors, a plurality of first stators and a first shaft rotatable about a first axis, the plurality of first rotors disposed axially along and rotatable with the first shaft, each of the plurality of first rotors comprising a plurality of first rotor magnets, the plurality of first stators axially interspersed with the plurality of first rotors along the first axis, and each of the plurality of first stators comprising a plurality of first stator magnets; and a second electric machine including a plurality of second rotors, a plurality of second stators and a second shaft rotatable about a second axis, the plurality of second rotors disposed axially along and rotatable with the second shaft, each of the plurality of second rotors comprising a plurality of second rotor magnets, the plurality of second stators axially interspersed with the plurality of second rotors along the second axis, each of the plurality of second stators comprising a plurality of second stator magnets, and at least one of a first of the plurality of second rotors axially aligned with the first of the plurality of first stators; or a first of the plurality of second stators axially aligned with a first of the plurality of first rotors.

20. The apparatus of claim 19, wherein at least one of a second of the plurality of second rotors is axially aligned with a second of the plurality of first stators; or a second of the plurality of second stators axially aligned with a second of the plurality of first rotors.

* * * * *